(12) United States Patent
Spencer

(10) Patent No.: US 6,253,663 B1
(45) Date of Patent: Jul. 3, 2001

(54) IN-WALL COFFEE MAKER

(76) Inventor: William L. Spencer, 159 Hale-Barber Rd., Kelso, WA (US) 98626

(*) Notice: Subject to any disclaimer, the term of this patent is extended or adjusted under 35 U.S.C. 154(b) by 0 days.

(21) Appl. No.: 09/537,973

(22) Filed: Mar. 28, 2000

(51) Int. Cl.⁷ .................................................. A47J 31/00
(52) U.S. Cl. ................... 99/279; 99/300; 99/304
(58) Field of Search ............................. 99/279, 281, 300, 99/304, 305, 306, 307, 290, 284; 248/906, 27.1, 27.3

(56) References Cited

U.S. PATENT DOCUMENTS

| | | |
|---|---|---|
| D. 202,462 | 10/1965 | Lofgren . |
| 1,748,234 | 2/1930 | Loeb . |
| 2,282,387 | 5/1942 | Schenck . |
| 2,558,536 | 6/1951 | Bruder . |
| 3,036,512 | 5/1962 | Tarrant et al. . |
| 3,771,432 | 11/1973 | Karlen ..................................... 99/304 |
| 4,630,532 | * 12/1986 | Sonnentag et al. ..................... 99/279 |
| 4,662,271 | 5/1987 | Woltermann ........................... 99/299 |
| 4,694,738 | * 9/1987 | Tarozzi .................................... 99/279 |
| 4,728,281 | * 3/1988 | McGuffin et al. ................. 99/279 X |
| 4,872,403 | 10/1989 | LaGeese et al. ....................... 99/280 |
| 5,063,836 | 11/1991 | Patel ....................................... 99/281 |
| 5,539,856 | * 7/1996 | Andrew et al. ..................... 99/281 X |
| 5,562,163 | 10/1996 | Sartain et al. .......................... 169/51 |

FOREIGN PATENT DOCUMENTS

| | | |
|---|---|---|
| 1121089 | 2/1957 | (DE) . |
| 1128462 | 3/1955 | (FR) . |
| 403395515 | * 12/1991 | (JP) . |

OTHER PUBLICATIONS

Miele web site http://www.miele.com/usa/cva (date unknown).

* cited by examiner

Primary Examiner—Reginald L. Alexander
(74) Attorney, Agent, or Firm—Marger Johnson & McCollom, P.C.

(57) ABSTRACT

An in-wall coffee maker includes a coffee maker unit received in a mounting structure mounted within a wall cavity. The mounting structure includes engagement tabs to enable engagement of the mounting box to one or more wall structures and attachment flanges or tabs with apertures to receive fasteners from mating apertures in the coffee maker unit to attach the coffee maker unit in the mounting structure. The in-wall coffee maker unit can also include a metered water connection to facilitate a self-filling capability.

19 Claims, 7 Drawing Sheets

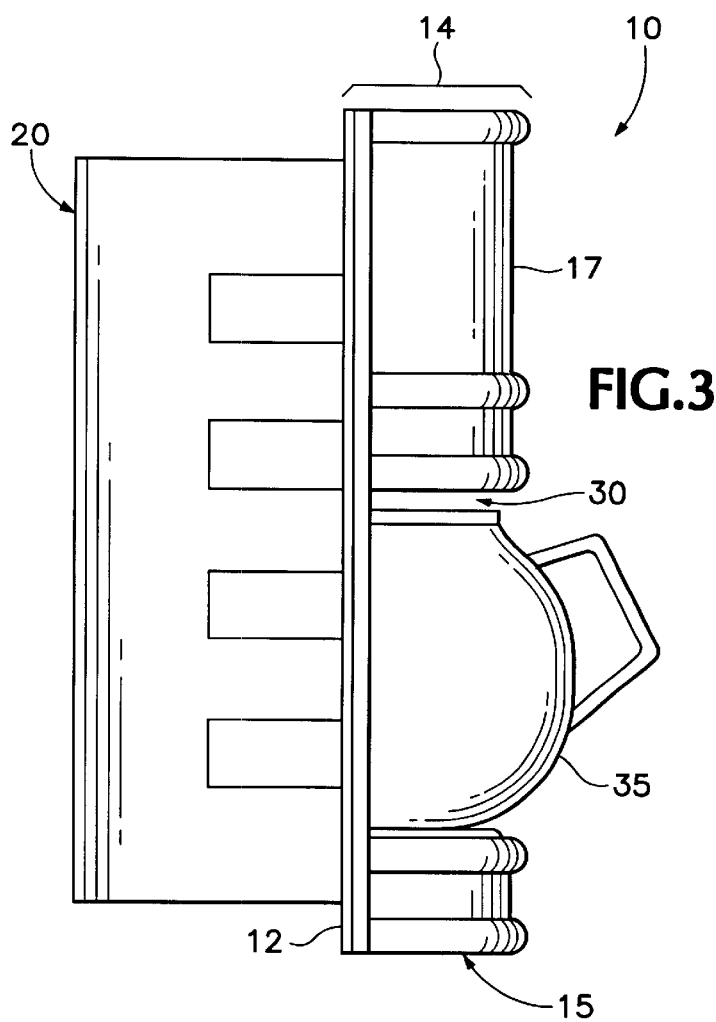
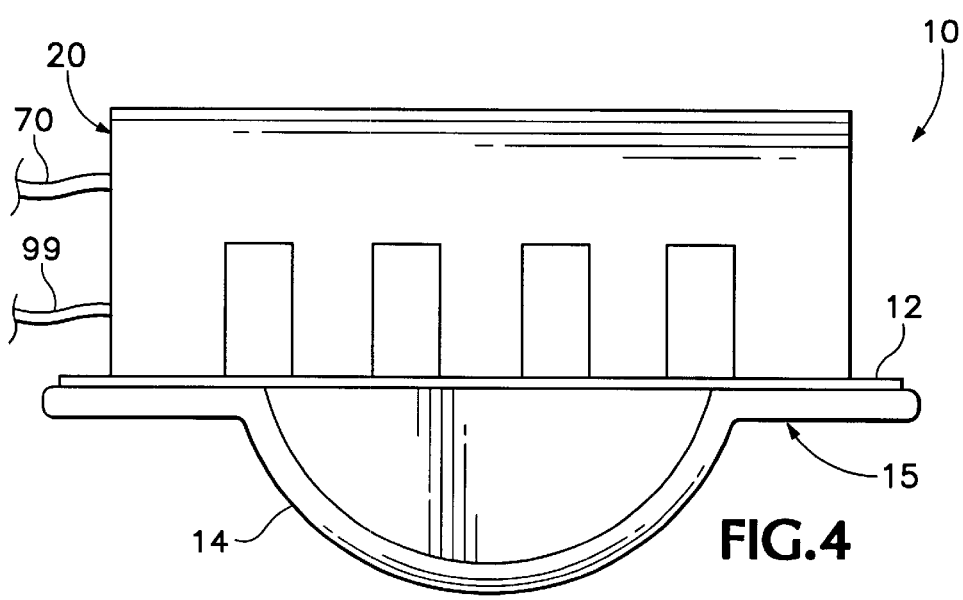

IN-WALL COFFEE MAKER

BACKGROUND OF THE INVENTION

This invention relates generally to automatic coffee makers. More specifically, this invention relates to coffee makers that are built into a wall of a dwelling, recreational structure, or vehicle. This invention also relates to self-filling home coffee makers.

Prior art coffee makers suffer from several drawbacks. First of all, most traditional coffee makers require a user to fill a reservoir of the coffee maker with water before operating the coffee maker. This is inconvenient because it generally requires the user to fill a separate container with water and transport it from the water source to the coffee maker. This can also be messy. Water is frequently spilled either when transporting the water to the coffee maker or when pouring the water from the separate container into the coffee maker's water reservoir. Commercial-sized coffee makers are permanently plumbed but have other drawbacks, such as size, that make them undesirable for home use.

An additional problem with prior art coffee makers is that they take up valuable counter space. Coffee drinkers generally prefer to have coffee on a daily basis and, consequently, coffee makers are generally left out on the counter to allow frequent use without the hassle of repeated setup. Unfortunately, this means that the coffee maker is permanently taking up counter space that might be needed for other things. This is particularly troubling in homes, apartments, hotels, offices, motor homes, and boats where counter space is limited or non-existent. Smaller coffee makers have been manufactured to take up less room, but they still take up counter space. Other coffee makers have been mounted under cabinets to free up counter space, but these are generally positioned over the counter and therefore continue to limit the free space above the counter for use in food preparation or for placement of other kitchen devices. Some prior art coffee makers have even been mounted inside cabinets. Although cabinet-mounted coffee makers do not occupy counter space, they instead take up valuable storage space.

The industry has been unable to supply a coffee maker that is ideally space conservative. What is needed, therefore, is a coffee maker that avoids taking up valuable countertop, cabinet, or above-counter space. The industry would also be benefitted by a self-filling home coffee maker.

SUMMARY OF THE INVENTION

An object of the present invention is to enable a coffee maker that takes up little or no counter or above-counter space and is not cabinet mounted.

Another object of the present invention is to enable a space conservative coffee maker that is self-filling.

This invention provides a significant improvement in the art by enabling a coffee maker that is mounted within the wall of a house, apartment, hotel room, office, motor home, boat, recreational vehicle (RV), or the like. An in-wall coffee maker according to the present invention includes a mounting structure for mounting a coffee maker unit within a wall. The mounting structure includes engagement structures to enable engagement between the mounting structure and one or more wall structures, and also includes attachment members to enable attachment with a coffee maker unit. The coffee maker unit mounts to or within the mounting structure. The coffee maker unit can include a water meter configured to provide a regulated supply of water from an incoming water line to a water reservoir. An electrical junction box can also be provided to supply electrical power from a power source to the coffee maker.

An in-wall coffee maker according to this invention is ideally space conservative because it occupies space not generally used. By placing the in-wall coffee maker of this invention within a wall cavity, no countertop space and little or no above-counter space is required. Furthermore, cabinet space is also not required. Also, by providing a self-filling capability through the use of a water meter, the in-wall coffee maker of this invention becomes extremely convenient to use.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 3 is a side elevation view of the in-wall coffee maker of FIG. 2 with dashed lines indicating a location of a wall panel when the in-wall coffee maker is mounted within the wall cavity.

FIG. 4 is a top plan view of the in-wall coffee maker of FIG. 2, also with dashed lines indicating the location of the wall panel when mounted.

DETAILED DESCRIPTION

Figure 1:
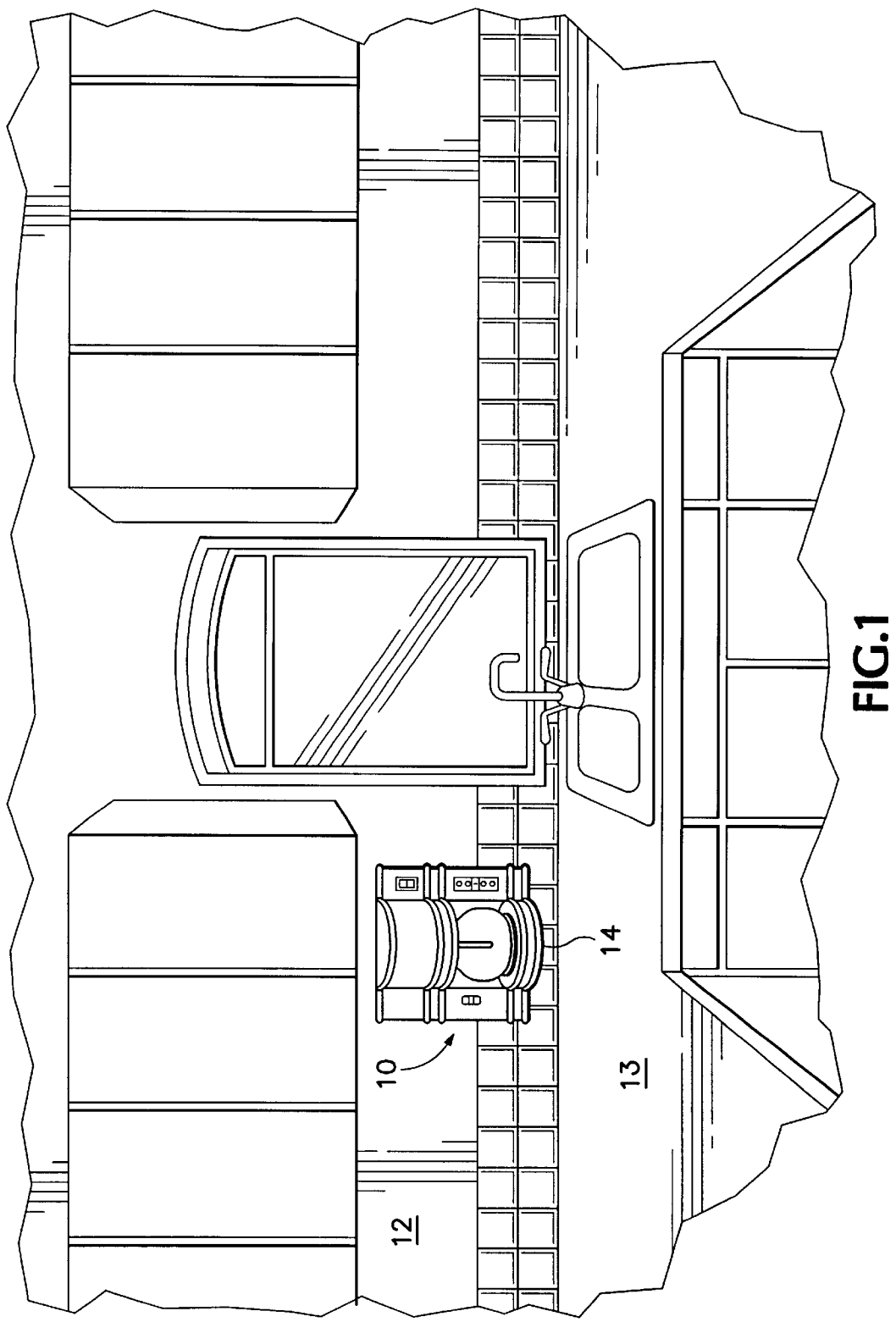
FIG. 1 is a perspective view of an in-wall coffee maker according to a preferred embodiment of the present invention, shown mounted within a wall cavity of a building.

FIG. 1 is a perspective view of an in-wall coffee maker 10 mounted within a wall cavity in a kitchen area according to one embodiment of the present invention. The basic advantages of this invention are evident from FIG. 1. Particularly, as illustrated, the in-wall coffee maker 10 does not occupy any space on top of the counter 13. Furthermore, the amount of above-counter space it occupies is minimal or none. In the embodiment shown, only a small semicircular projection 14 protrudes into the room from the wall panel 12. In an alternative embodiment, the face 17 can be configured to lie flush with the wall 12. In that embodiment, no above-counter space is occupied by the in-wall coffee maker 10. Also according to this invention, no cabinet space is occupied by the in-wall coffee maker 10. Accordingly, the in-wall coffee maker 10 of this invention leaves counter, above-counter, and cabinet space available for activities or other kitchen appliances. The specific features of the in-wall coffee maker 10 will now be more fully discussed with reference to FIGS. 2–4.

Figure 2:
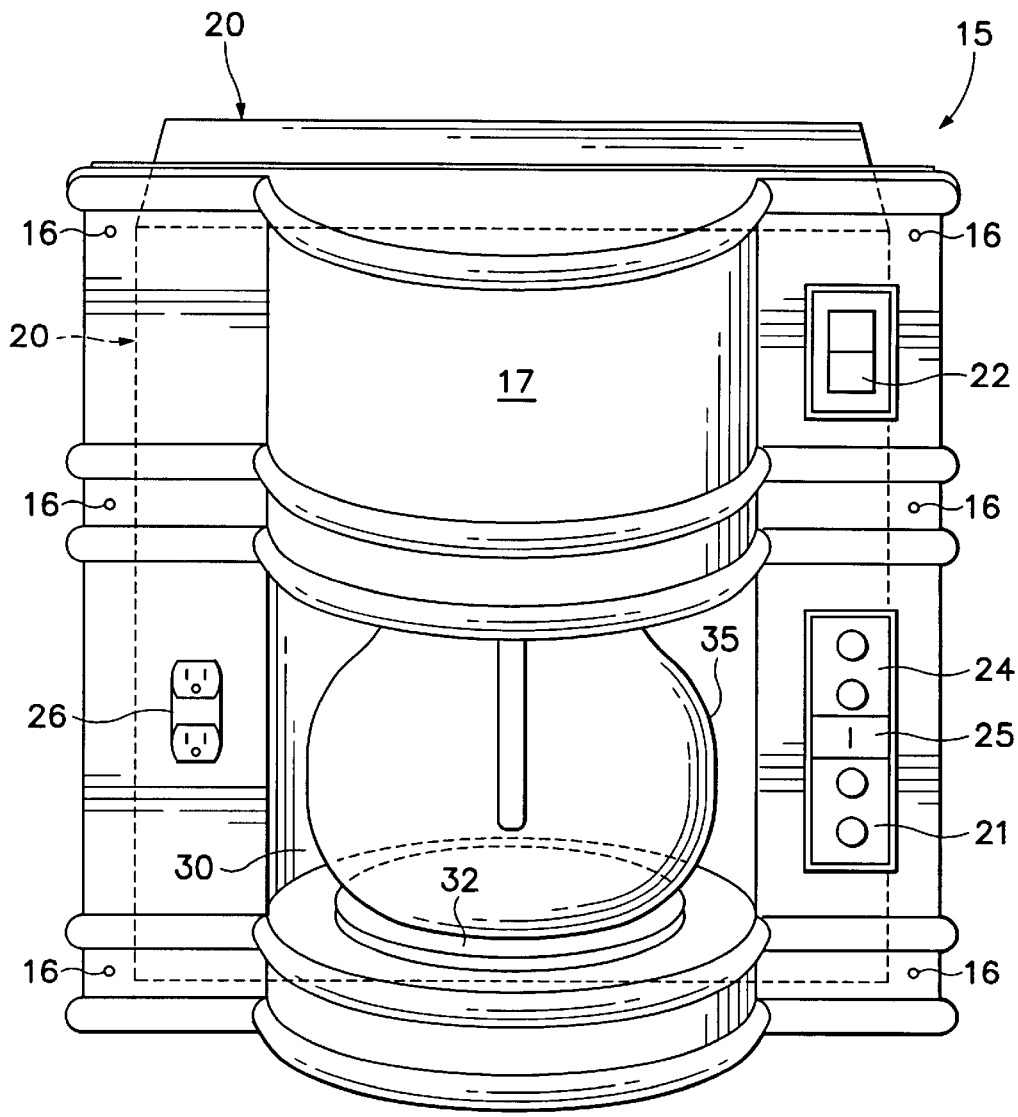
FIG. 2 is a perspective view of the in-wall coffee maker of FIG. 1, shown removed from the wall cavity.

FIG. 2 is a perspective view, and FIGS. 3 and 4 are a side elevation and a top plan view, respectively, of the in-wall coffee maker 10 of the present invention according to the embodiment of FIG. 1. Referring to FIGS. 2–4, according to one embodiment, the in-wall coffee maker 10 includes a mounting structure, such as a mounting box 20, that receives a coffee maker unit 15. The coffee maker unit 15 is attached to the mounting box 20 using attachment structures. In this embodiment, the attachment structures include flanges 60 (see FIG. 6) in the mounting box 20 having holes 16A that allow fasteners, such as screws, to be threaded through mating holes 16 in the face 17 of the coffee maker unit 15 into the wall panel 2. Of course, it should be evident that any type of attachment between the coffee maker unit 15 and the mounting box 20 is within the contemplation of this invention, including, but not limited to, mechanical attachment via screws, rivets, bolts, nails, clips, latches, snap engagement, hook and eye material (i.e., VELCRO®), etc., or chemical attachment via glue or other adhesives.

Referring specifically to FIGS. 3 and 4, dashed lines represent the position of the wall panel 12 when the coffee maker 10 is mounted within a wall cavity. As illustrated by FIGS. 3 and 4, when mounted, most of the coffee maker 10 is retained within the wall cavity. Specifically, the coffee maker 10 of this preferred embodiment extends approximately four inches into the wall cavity while protruding only about two and one-half inches from the wall 12 at the center of its semicircular projection 14. Only a small portion of the coffee maker 10, therefore, protrudes from an outside face of the wall 12 after installation. As noted previously, another embodiment has a front face that lies flush with the wall. In-wall mounting is therefore extremely advantageous because it frees up countertop and above-counter space for other things.

Figure 5:
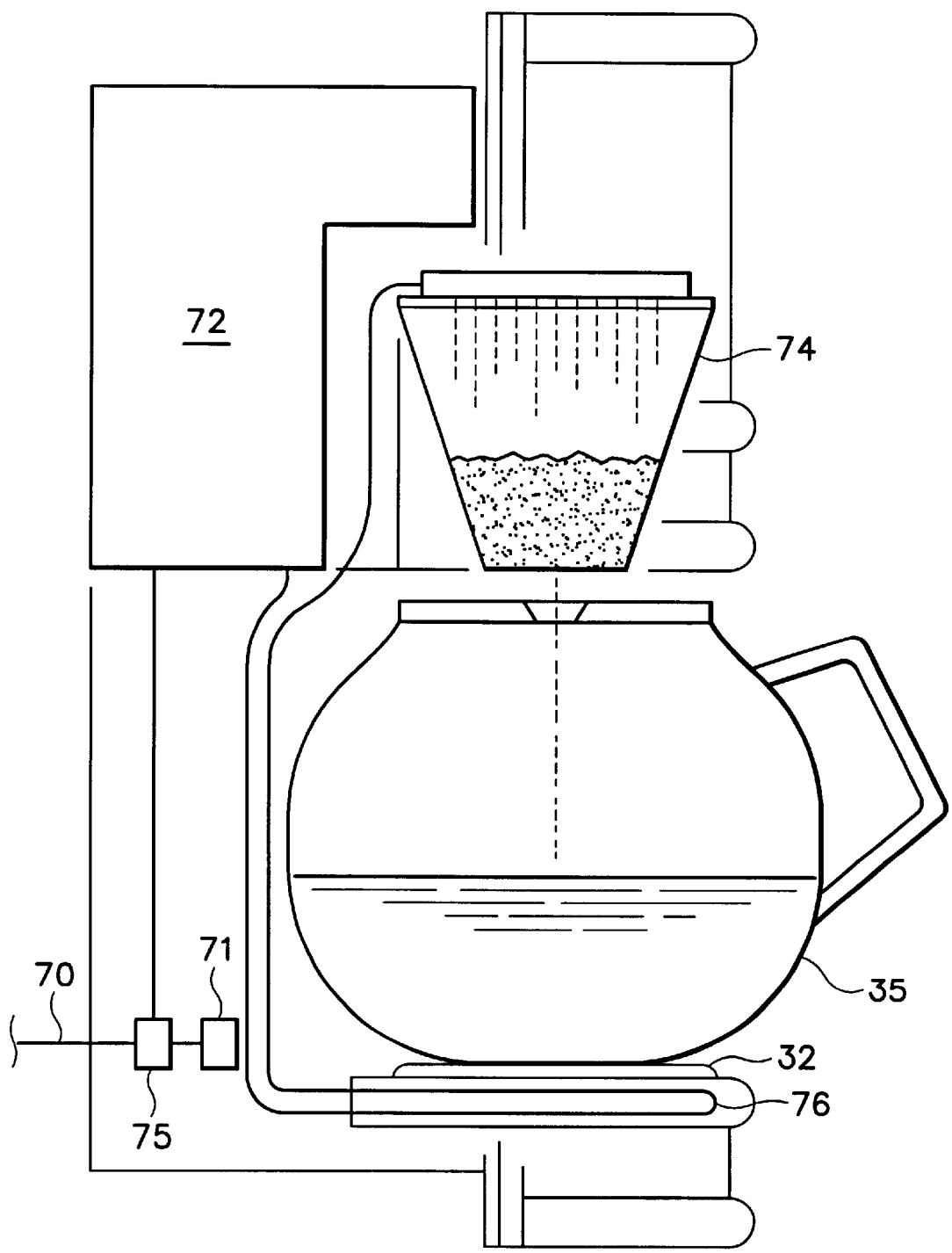
FIG. 5 is a schematic diagram illustrating the components of the coffee maker of FIG. 1 for providing a self-filling capability.

Unlike conventional home coffee makers, the coffee maker unit 15 of this invention also preferably includes a self-filling capability. FIG. 5 is a schematic diagram showing the components of the coffee maker of FIG. 1 for providing the self-filling capability. Self-filling coffee makers having various cup capacities are within the contemplation of this invention, including, for example, four, ten, and twelve cup embodiments. In the self-filling coffee maker, the user actuates a fill selector 71 to select the desired amount of coffee to be brewed, up to the maximum amount for that particular embodiment. After a user selects the desired cup amount for the coffee maker to produce, a water meter 75 (such as a solenoid valve connected to a timer) operates to regulate a supply of water from an incoming water line 70, generally from a cold water source, to provide the selected amount of water to the coffee maker unit 15. Specifically, a water metering system 75 is provided that can be controlled by a program on an electronic circuit or directly by a user. The water metering system 75 can be used in combination with a traditional heated water reservoir 72 or it can be used in an in-line heating system (not shown). In a water reservoir system, the meter 75 regulates a supply of water into the water reservoir 72. The water reservoir 72 typically contains a heating element 76 for heating the water to the desired temperature for brewing the coffee in the drip cone 74. In an in-line system, however, an in-line heating system (rather than a heated water reservoir 72) is used to heat water in route from the metering system 75 to a brewing area such as a drip cone 74 for brewing the coffee. A preferred water metering system is electric, but a water pressure-driven meter could also be used.

Another feature of this embodiment is the provision of electrical power outlets 26 located on the face 17 of the coffee maker unit 15. The outlets 26 are wired to an electrical power source through an electrical junction box 50 (see FIG. 6) in the mounting box 20. These outlets 26 allow other electrical appliances to be plugged in and receive electrical power through the coffee maker unit 15.

The coffee maker unit 15 also preferably includes conventional coffee maker features known in the art. Some of these features include a programming control 21 for an on/off timer, a manual on/off switch 22, a 24-hour digital clock 24, and a power indicator 25 all located on the face 17. Also, a coffee pot 35 can be removably supported within a coffee pot cavity 30 on a warming plate 32. The on/off timer of the coffee maker unit 15 is preferably fully programmable to allow automatic starting at any desired time. Another preferable feature is a two-hour automatic shutoff. The specific details regarding the provision of these and other electronic features is known to those of skill in the art.

Figure 6:
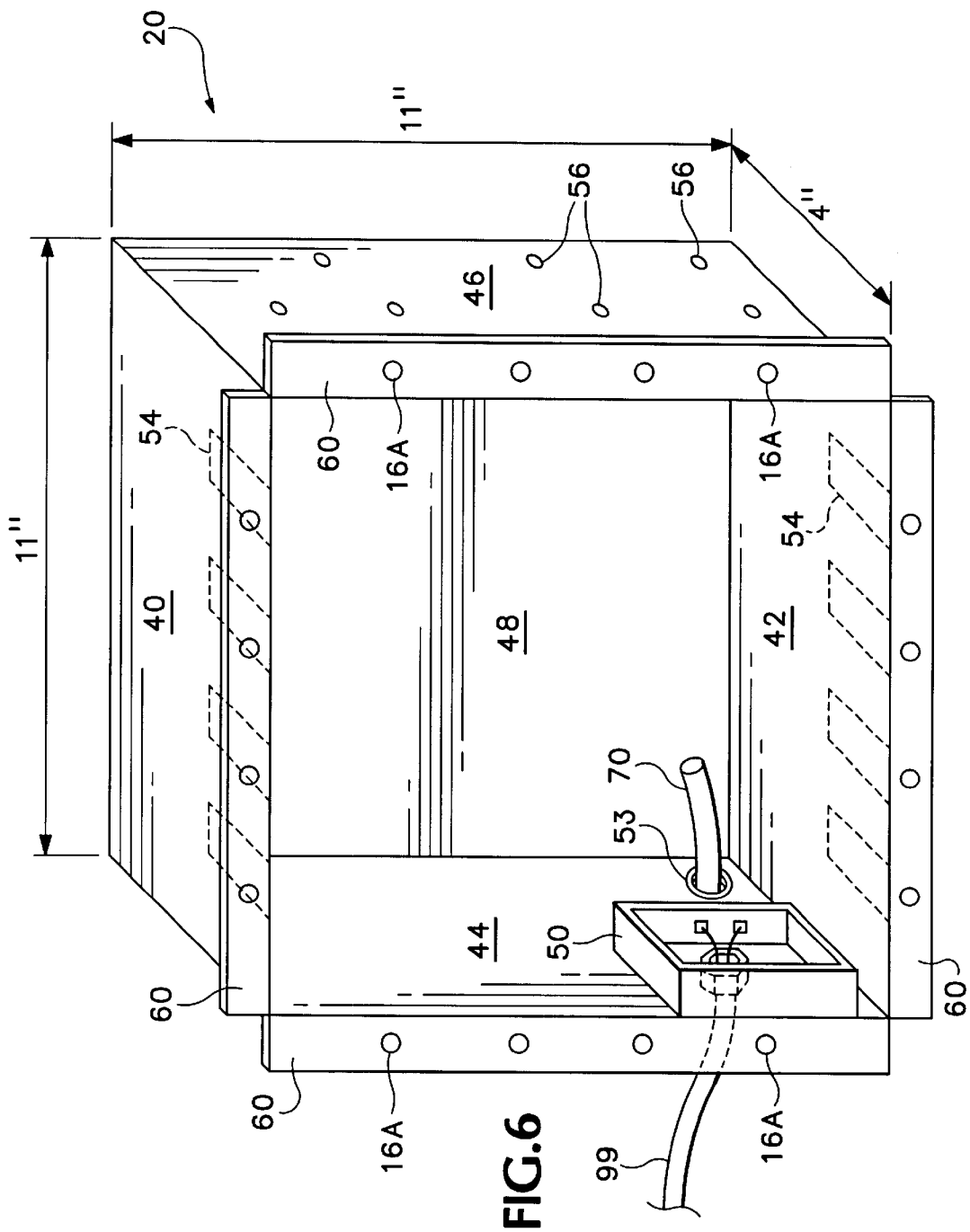
FIG. 6 is a perspective view of a mounting box configured to secure the coffee maker unit of FIG. 2 within the wall cavity, as shown in FIG. 1.

FIG. 6 is a front perspective view of one embodiment of the mounting box 20, into which the in-wall coffee maker unit 15 is installed, according to this invention. Referring to FIG. 6, the mounting box 20 is preferably a rough-in sheet metal box that includes a top wall 40, a bottom wall 42, two side walls 44, 46, and a rear wall 48. Preferred dimensions for the mounting box 20 for a ten-twelve cup coffee maker 10 are approximately 11" wide by 11" tall by 4" deep. For a four cup embodiment, the preferred dimensions are approximately 8" wide by 8" tall by 3" deep. Flanges 60 or tabs are provided along a front portion of each of the top, bottom, and side walls 40, 42, 44, 46 of the mounting box 20. The flanges 60 provide attachment members for attaching the mounting box 20 to the coffee maker unit 15. Fasteners can be used to secure the coffee maker unit 15 to the mounting box 20 via the flanges 60. If screws are used as the fasteners, each of the flanges 60 preferably contains one or more holes 16A for receiving the screws from mating holes 16 in the coffee maker unit 15. As noted previously, the attachment members according to this invention are not limited to the flanges 60 with screw holes 16A of this embodiment. Rather, any type of attachment that is sufficient to secure the coffee maker unit 15 to the mounting structure 20 is within the scope of this invention. The attachment, however, is preferably non-permanent, such that the coffee maker unit 15 can be easily removed from the mounting box 20 for maintenance, repair, or replacement. Furthermore, in some embodiments, no attachment members are required at all. For instance, the coffee maker unit 15 can rest within the mounting box 20 (or on a mounting shelf) without being secured thereto and still satisfy the requirements of this invention.

The mounting box 20 also preferably includes engagement members in the form of tabs 54 formed from cut out portions of the top 42, bottom 44 and side walls 46, 48. The tabs 54 are cut from the sheet metal box 20 in such a way that they can be bent outwardly from the box 20 to engage a wall panel 12 (see FIG. 1), such as sheet rock, wood paneling, etc. Specifically, the tabs 54 can be rectangular-shapes cut out along three edges or triangular shapes cut out along two edges, among others. Redundant or alternative securing can be provided by engagement members in one of the side walls 44, 46 used to fasten the mounting box 20 to a wall stud 84 (see FIG. 8). For example, mechanical fasteners such as nails, screws, bolts, etc., 85 can be applied through holes 56 to secure the mounting box 20 to the wall stud 84. A chemical engagement member, such as an adhesive strip, or any of a number of other types of engagement members could also be used to secure the mounting box to the stud 84, obviating the need for holes 56.

Still referring to FIG. 6, an electrical junction box 50 is provided along one of the side walls 44 of the mounting box 20. The junction box 50 can be formed along any of the walls 40, 42, 44, 46, 48. The electrical junction box 50 can be a conventional single gang outlet box configured to allow hardwiring between the in-wall coffee maker 10 and power supply lines of the building or vehicle in which the coffee maker 10 is installed. The power supply lines may provide AC (i.e., 110V or 220V) or DC (i.e., 12V) power, depending on the power available. For situations where hardwiring is impracticable or undesirable, the electrical junction box can comprise a power cord that allows the coffee maker 10 to be plugged into an existing power outlet. The coffee maker unit 15 is electrically connected to power connections in the junction box 50. The electrical connection between the coffee maker unit 15 and the junction box 20 can be established through hardwiring or a power cord can be provided on the coffee maker unit 15 that plugs into a conventional-type outlet in the junction box 50. Yet another possible embodiment would include having a simple male/female interface between a power connector on the coffee maker unit 15 and a power connector in the electrical junction box 50. In this way, the coffee maker unit 15 could simply be inserted into the mounting box 20 such that its power connector (e.g., a plug) slides into engagement with the power connector (e.g., a receptacle) of the junction box 50, without the need for additional wiring. Besides receiving power for the coffee maker unit 15 itself, the in-wall coffee maker 10 can include power lines routed from the junction box 50 to electrical outlets 26 on the front face 17 of the coffee maker unit 15 to provide electrical power to external devices. Yet another alternative embodiment is provided by extending an edge of face 17 of the coffee maker unit 15 beyond the side wall 44 of the mounting box 20 and by providing a slidable plug on the face 17 which can be plugged directly into an electrical wall socket located proximal with the coffee maker 10.

In a self-filling embodiment, described again with reference to FIG. 6, an incoming water line 70 enters the mounting box 20 through a hole 52 in one of the walls 40, 42, 44, 46, 48 thereof. As with the junction box 50, the hole 52 can be located within any one of the walls 40, 42, 44, 46, 48, although, in this embodiment, it is located in the same side wall 44 as the junction box 50. The hole 52 for receiving the incoming water line 70 is provided with a rubber grommet 53 to protect the water line 70 from being damaged by the sharp edges of the sheet metal mounting box 20. Alternatively, a plumbing fixture, such as an "I" connector, could be used in the hole 52 to allow the incoming water source line 70 to be connected to an outside end of the connector and a water reservoir line to be connected to an opposite end of the connector on the inside of the mounting box 20. The water reservoir line receives water from the incoming water source line 70 through the connector and supplies water to the water reservoir through a metering system 75. Yet another embodiment that can further simplify installation includes male/female plumbing connectors on the coffee maker unit 15 and the mounting box 20. The male/female plumbing connectors allow the coffee maker unit 15 to be connected directly to the incoming water supply line 70 without requiring tubing between the mounting box 20 and the coffee maker unit 15.

Although the preferred material for the mounting box 20 is sheet metal because of its ease of manufacture and adaptability, other materials, such as plastic, wood, etc., could also be used for the mounting box 20. The use of other materials would require only minor modifications to the mounting box 20. Tabs 54 of the sheet metal box, for instance, in a plastic or wood box, could be replaced by other types of engagement structures such as clips or other fasteners. Also, although the mounting structure of the foregoing embodiments was a mounting box 20, it should be noted that any mounting structure that is capable of supporting the coffee maker unit 15 in place within the wall cavity is within the contemplation of this invention. For instance, a mounting bracket, a mounting shelf, a mounting hook(s), etc., could all be used for this purpose. A sheet rock screw can also be used to secure the box from either a side, top, or bottom location. Metal bars (i.e., "T", "L", or "I" bars) could also be added behind the box to secure it.

Figure 7:
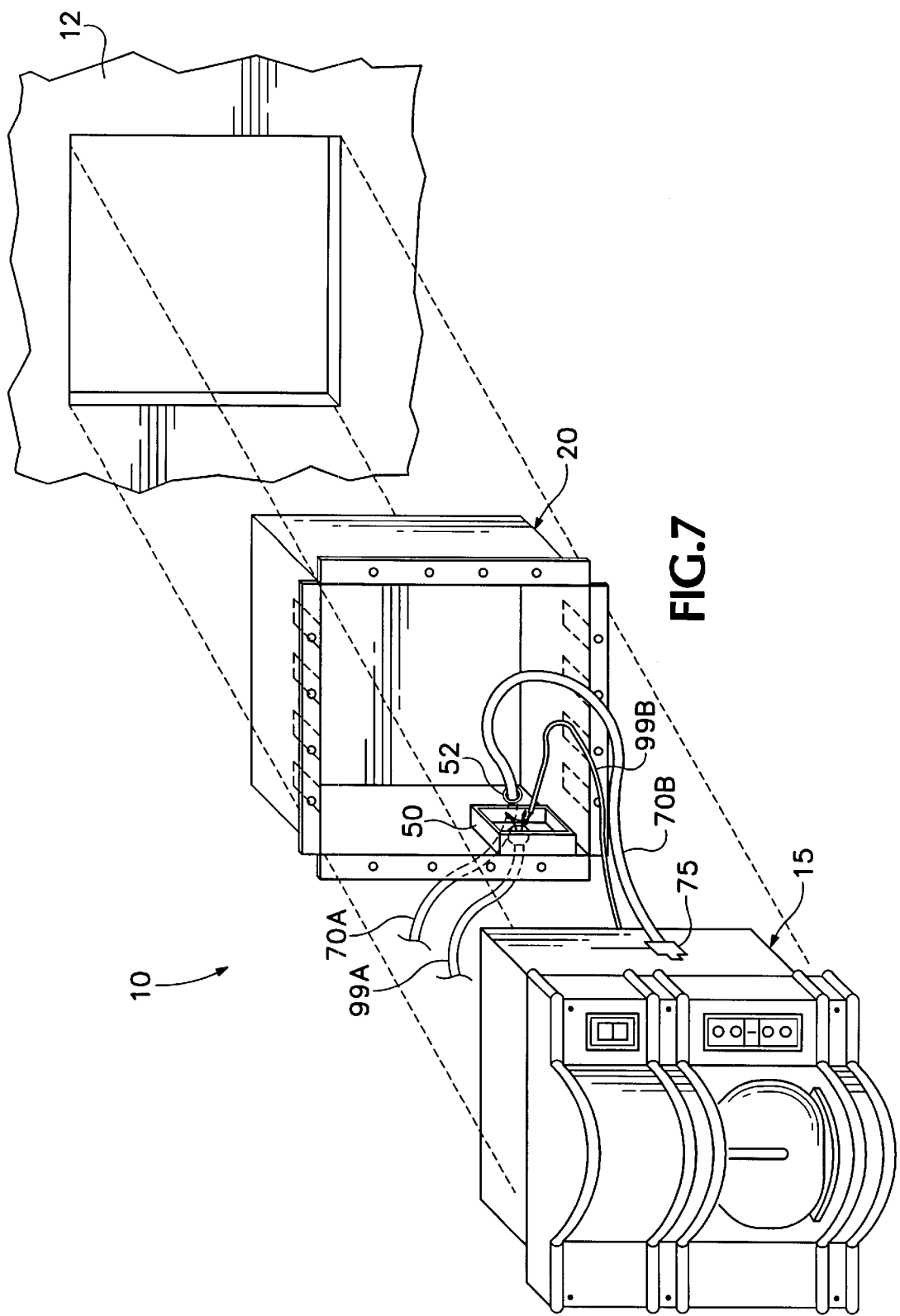
FIG. 7 is an exploded perspective view of the coffee maker unit of FIG. 2 removed from the mounting box of FIG. 6.

FIG. 7 is an exploded perspective view of the coffee maker unit 15 and the mounting box 20 illustrating an interface between them. As illustrated by FIG. 7, the mounting box 20 receives and supports the coffee maker unit 15 within a wall cavity and provides the necessary water 52 and power 50 interconnections. Specifically, an incoming water line 70A provides water to the mounting box 20 through hole (or plumbing fixture) 52. An internal water line 70B (either the same as line 70A or connected thereto via a plumbing fixture) supplies water to a water meter 75 of the coffee maker unit 15. Also, electrical power is provided to the junction box 50 of the mounting box 20 by an external power cable 99A. Power from the junction box 50 to the coffee maker unit 15 is supplied via an internal power cable 99B. Although the embodiments described so far have included a separate mounting structure, it should be noted that one embodiment of this invention can include a coffee maker unit provided with an integral mounting structure to mount with a wall structure that has the necessary water and power interconnections provided directly thereon. In such an embodiment, a separate mounting structure would be unnecessary.

A method for installing the in-wall coffee maker of FIGS. 1–7 will now be described in detail with reference to FIGS. 6, 7, and 8. It should be noted, however, that most of the following steps need not be performed in the order in which they are described. The first step is to locate an area for installation. The installation area for a self-filling coffee maker should be near a water source 90, such as is typically found near a sink, dishwasher, or refrigerator (if plumbed for ice/water), to facilitate easy routing of the incoming water line 70. The installation area should also be located near a power source 92. The width between wall studs 84 at the installation area should be checked to make sure that the coffee maker 10 will fit between them. Specifically, the opening between studs 84, or cavity width, should not be less than 11" wide for the ten-twelve cup embodiment and not less than 8" wide for the four cup embodiment. Also, the power outlet area 92 should not be within the cavity width.

Once a suitable location has been selected, a template corresponding to the desired size of the wall cut out is used to properly mark a cut out area on the wall panel 12. The cut out area should be above the typical 4" back splash 82. If the back splash 82 is higher than typical and is noticeably in the way, the installation location may have to be altered, or a professional may need to be hired, to install the unit. Otherwise, the back splash 82 can be modified by cutting around the necessary areas to facilitate installation. Once the cut out area is marked, the marked area of the wall panel 12 can be cut out using any suitable cutting tool, such as a saw, and then removed. At this point, an area directly below counter 13 height from the cut out area should be located, and a ½" hole should be drilled through the wall at this location. Holes adjacent to this hole should also be drilled along the wall 12 in the direction of the water source 90. These holes should be spaced a few inches apart to enable the person installing the unit to run the water line 70 (preferably ¼") to the installation area. Once all the holes are finished, the water line 70 is routed from the water source 90 to the installation location. Plenty of line length should be left at both ends to make sure that a proper connection can be made. No excess line should be cut off at this point.

A cold water valve at the cold water source 90 is now turned off. An "I" connection (preferably either ⅜" by ¼" or ¼" by ¼") can be used to tie in the water line 70 to the mounting box 20. Alternatively, the water line 70 can be run through the hole 52 in the mounting box 20 and connected to the coffee maker unit 15 using an "I" connection. The water should not be turned back on yet. The electrical junction box 50 should next be connected to the power source 92, either with a power cord connection or hardwire integration. Hardwire integration may require a professional electrician and is described in further detail below.

In the case of a hardwire connection, a nearby power source 92 (i.e., an electrical outlet) is found. This outlet 92 should be located within one stud cavity away from the installation area. The power to this outlet 92 is then turned off to prevent the risk of electrocution. Any necessary holes in the studs 84 should then be drilled in order to route a power cable 99A from the power source 92 to the junction box 50. Next, the necessary cable length is cut and fed into the outlet box. The outlet 92 is disconnected so the wire can be safely pulled into the outlet box. The power cable 99A can then be routed into the mounting box 20 and the power lines tied to the junction box 50.

Figure 8:
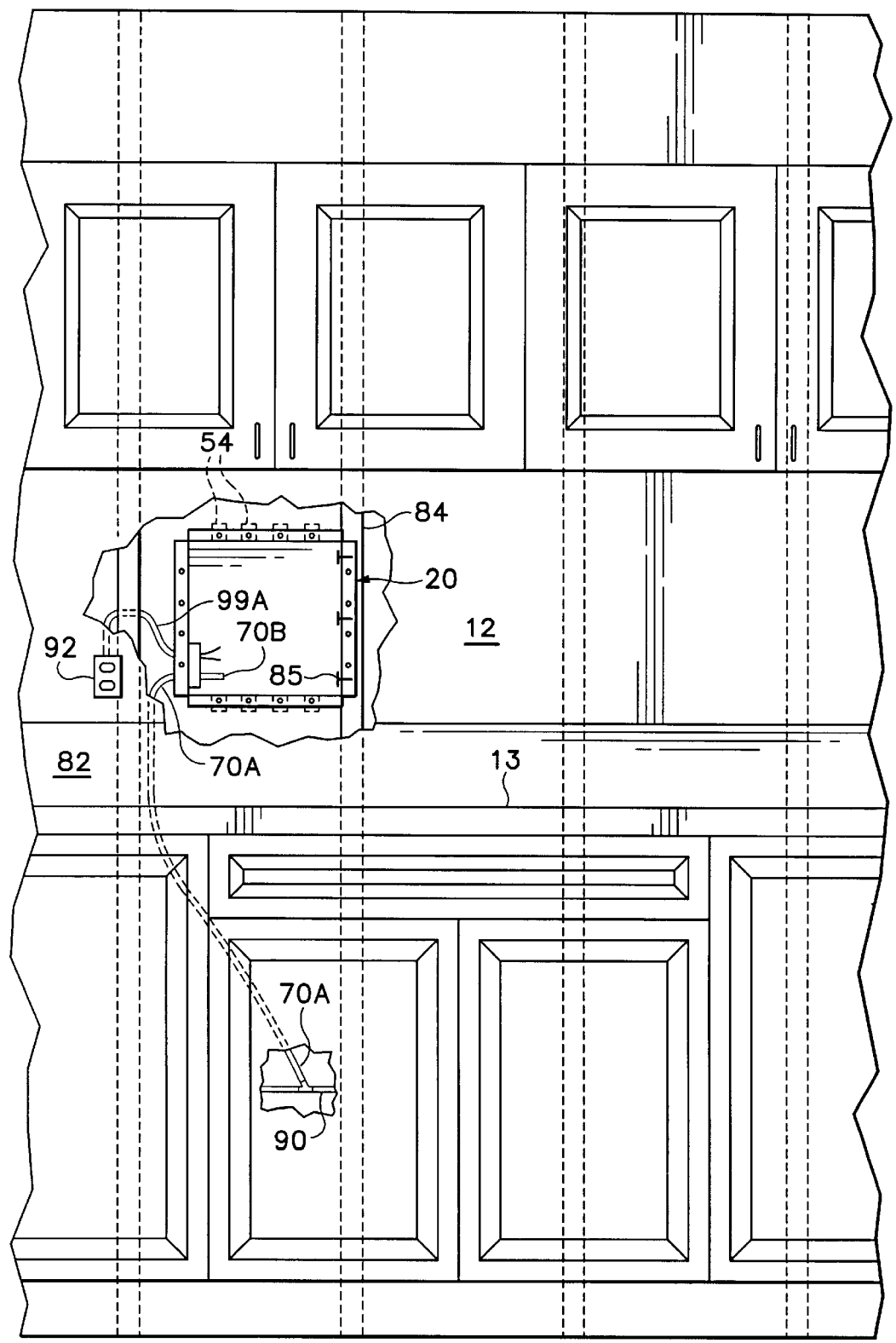
FIG. 8 is an illustration of a wall installation area set up for mounting the in-wall coffee maker shown in FIG. 1.

Referring still to FIGS. 6, 7, and 8, once the power lines and water line 70 are connected to the mounting box 20, the mounting box 20 is placed in the wall cavity so that the opening of the mounting box 20 is flush with the wall panel 12. When the entrance to the mounting box 20 is flush against the outside of the wall panel, the tabs 54 are bent outwardly to secure the box 20 to the wall panel 12. If necessary, a side wall of the mounting box 20 can be further fastened to a wall stud 84 with fasteners such as nails 85. Of course, any other type of fastener such as screws, glue, etc., may be used. Next, the coffee maker unit 15 is installed into the mounting box 20. To do this, the coffee maker unit 15 is electrically connected to the power source at the junction box 50 and also connected to the incoming water line 70A. The electrical connection between the coffee maker unit 15 and the junction box 50 can be a plug-in connection or a hardwire connection, among others. The connection to the water line can be through a separate internal water line 70B and a plumbing fixture or directly between the unit 15 and the external line 70A, among others.

The coffee maker unit 15 should not be fully secured within the mounting box 20 until the water is checked and verified to be running properly. The cold water source 90 should therefore be turned on and the connections should be checked for leaks. If any leaks appear, they should be fixed. If there are no leaks, the unit 15 is then attached to the mounting box 20 via mating screw holes 16 in the unit 15 and flanges 60. Other types of attachment between the box 20 and the unit 15 are also acceptable. Also alternatively, the coffee maker unit 15 can have an integral mounting structure to allow it to be directly fastened to the wall panel 12 and be directly supplied with power and water without the need for a separate mounting box 20. In any event, once the coffee maker 10 is completely installed, the power can be turned on and the coffee maker unit 15 can be operated.

Installation of the in-wall coffee maker 10 of this invention in boats and motorhomes is relatively the same as for buildings such as houses, hotels, offices, and apartments. Because tabs 54 are provided in the rough-in box 20 that can be bent over to engage a wall panel 12, a wall opening of sufficient size to house the unit is the only requirement for installation. The tabs 54 will generally provide enough strength to hold the coffee maker 10 in place. Furthermore, additional holes 56 are available for securing the mounting box 20 to other wall structures if alternative or additional securing is needed.

A few of the many other possible embodiments of this invention will now be described in general terms. At the outset, it should be noted that ease of installation and maintenance are important considerations for designing a system according to this invention. It is desirable to have the installation as easy as possible and to have the ability to change out the unit quickly and easily if problems occur (such as a water leak or a malfunction with the unit itself). It is also important to make the face flush (or substantially flush) with the wall to provide the advantage of freeing countertop space. Other important considerations include avoiding problems associated with the water supply or power supply issues through reliable connections.

Although the primary embodiment includes a rough-in sheet metal box with hardwired power and water connections, there are numerous other possible ways to accomplish the objects of this invention. For instance, an enclosure made of plastic, wood, or other material can be built inside a wall cavity and provided with a water metering system. A conventional countertop coffee maker can then be fitted within the enclosure, connected to a power source, and receive water into its water reservoir from the water metering system. A slide-in unit is also contemplated where the water and power sources are supplied through male to female connectors that engage each other as the unit is slid into place.

Yet another alternative is to frame-in and sheet rock an alcove area and place a water dispenser and outlet inside this area. A conventional coffee maker could then be placed within the alcove. Another alternative includes providing a frame, similar to a picture frame, to an existing coffee pot to support it within a wall cavity. The coffee pot is connected to a water supply and a power supply and placed within the wall cavity, using the frame to support it in place. Furthermore, a mounting bracket or a shelf could be used instead of a mounting box to support the in-wall coffee maker within the wall cavity according to this invention. Still other embodiments are possible which are not described here but are within the spirit of the invention and should be considered to be within the scope of the claims.

Having described and illustrated the principles of the invention in various embodiments thereof, it should be apparent that the invention can be modified in arrangement and detail without departing from such principles. I claim all modifications and variations coming within the spirit and scope of the following claims.

What is claimed is:

1. An in-wall coffee maker comprising:
   a coffee maker unit; and
   a mounting structure for mounting the coffee maker unit within a wall cavity, the mounting structure including engagement structures to enable engagement of the mounting structure to one or more wall structures;
   wherein the coffee maker unit is connected to an electrical power source and further comprises one or more electrical outlets located on a front face of the coffee maker unit to provide electrical power to other devices.

2. An in-wall coffee maker according to claim 1, wherein the mounting structure is integral with a housing of the coffee maker unit.

3. An in-wall coffee maker according to claim 1, further comprising:
   a metering system for regulating an amount of water supplied from an incoming water line to the coffee maker unit.

4. An in-wall coffee maker according to claim 1, wherein the engagement structures include tabs for engaging a wall panel.

5. An in-wall coffee maker according to claim 1, wherein the mounting structure is provided separate from a housing of the coffee maker unit and wherein the in-wall coffee maker further comprises attachment structures to enable attachment between the mounting structure and the coffee maker unit.

6. An in-wall coffee maker according to claim 1, wherein the attachment structures comprise one or more flanges extending from one or more wall portions of the mounting structure, each flange including one or more holes to enable fasteners to secure the coffee maker unit to the mounting structure through mating holes in the coffee maker unit.

7. An in-wall coffee maker according to claim 1, wherein the coffee maker unit is connected to an electrical power source and further comprises one or more electrical outlets located on a front face of the coffee maker unit to provide electrical power to other devices.

8. An in-wall coffee maker according to claim 1, wherein the mounting structure is a mounting box comprising a top wall, a bottom wall, two side walls, and a rear wall.

9. A coffee maker according to claim 8, wherein the mounting box is a rough-in sheet metal box.

10. A self-filling, in-wall coffee maker comprising:
    a coffee maker unit comprising a water reservoir;
    a metering system for regulating an amount of water supplied from an incoming water line to the water reservoir of the coffee maker unit;
    a mounting box for mounting the coffee maker unit within a wall cavity, said mounting box comprising a top wall, a bottom wall, and two side walls;
    a frontal opening defined in the mounting box between the two side walls and between the top and bottom walls shaped to receive the coffee maker unit;
    a receiving aperture defined within one of the walls of the mounting box for communicating with the incoming water line; and
    engagement structures located along one or more walls of the mounting box to allow attachment of the mounting box to one or more wall structures.

11. A self-filling, in-wall coffee maker according to claim 10, wherein the mounting box comprises a rough-in box.

12. A self-filling, in-wall coffee maker according to claim 11, wherein the engagement structures comprise tabs formed in the top, bottom, and side walls that extend outwardly to attach the mounting box to one or more wall panels.

13. A self-filling, in-wall coffee maker according to claim 10, wherein the engagement structures comprise one or more fasteners located along a side wall to enable attachment of the mounting box to a wall stud.

14. A self-filling, in-wall coffee maker according to claim 10, further comprising an electrical junction box located along one of the walls of the mounting box.

15. A coffee maker comprising:
    a housing;
    a water reservoir located within the housing to receive a supply of water;
    a brewing area located within the housing to contain a supply of coffee grounds and to receive water from the water reservoir;
    a coffee pot receptacle located within the housing to house a coffee pot such that the coffee pot is located to receive coffee from the brewing area,
    wherein the housing of the coffee maker is shaped and configured to fit within a wall cavity and attach to one or more wall structures, and
    wherein the housing further comprises a mounting structure comprising engagement structures to engage one or more wall structures and a unit body housing the water reservoir, the brewing area, and the coffee pot receptacle, and wherein the mounting structure is formed separate from the unit body and is configured to receivingly engage the unit body.

16. A coffee maker according to claim 15, wherein the mounting structure comprises a connector to supply power to the coffee maker and wherein the unit body comprises a mating connector to receive power from the mounting structure.

17. A coffee maker according to claim 15, further comprising a water meter for regulating the supply of water in the water reservoir.

18. A coffee maker according to claim 15, wherein the housing further comprises a unit body housing the water meter, the water reservoir, the brewing area, and the coffee pot receptacle, and wherein the mounting structure is formed separate from the unit body and is configured to receivingly engage the unit body.

19. A coffee maker according to claim 18, wherein the mounting structure comprises a connector to supply water to the coffee maker and wherein the unit body comprises a mating connector to receive water from the mounting structure.

* * * * *